United States Patent
Chen et al.

(10) Patent No.: US 10,609,384 B2
(45) Date of Patent: Mar. 31, 2020

(54) RESTRICTION ON SUB-BLOCK SIZE DERIVATION FOR AFFINE INTER PREDICTION

(71) Applicant: Futurewei Technologies, Inc., Plano, TX (US)

(72) Inventors: Huanbang Chen, Shenzhen (CN); Haitao Yang, Shenzhen (CN); Shan Gao, Shenzhen (CN); Yin Zhao, Shenzhen (CN); Jiantong Zhou, Shenzhen (CN); Shan Liu, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/032,979

(22) Filed: Jul. 11, 2018

(65) Prior Publication Data

US 2019/0089960 A1 Mar. 21, 2019

Related U.S. Application Data

(60) Provisional application No. 62/561,603, filed on Sep. 21, 2017.

(51) Int. Cl.
  *H04N 19/139* (2014.01)
  *H04N 19/119* (2014.01)
  (Continued)

(52) U.S. Cl.
  CPC ......... *H04N 19/159* (2014.11); *H04N 19/119* (2014.11); *H04N 19/139* (2014.11);
  (Continued)

(58) Field of Classification Search
  CPC .......................... H04N 19/159; H04N 19/119
  See application file for complete search history.

(56) References Cited

U.S. PATENT DOCUMENTS

| 8,526,495 B2 * | 9/2013 | Liu | H04N 19/159 |
| | | | 375/240.12 |
| 9,049,452 B2 * | 6/2015 | Liu | H04N 19/46 |

(Continued)

FOREIGN PATENT DOCUMENTS

| CN | 103931184 A | 7/2014 |
| CN | 104980762 A | 10/2015 |

(Continued)

OTHER PUBLICATIONS

Lai, P., et al., "Non-SCE3.4: Simplified Generalized Combined Prediction," JCTVC-M0222, Apr. 2013, 10 pages.

(Continued)

*Primary Examiner* — Irfan Habib
(74) *Attorney, Agent, or Firm* — Conley Rose, P.C.

(57) ABSTRACT

A video coding device selects a current block for sub-block based affine inter-prediction, and derives a sub-block size for a sub-block of the current block. The sub-block size includes a sub-block width and a sub-block height. The device determines a unidirectional width threshold (TwU), a bidirectional width threshold (TwB), a unidirectional height threshold (ThU), and a bidirectional height threshold (ThB), where a total value of TwB and ThB exceeds a total value of TwU and ThU. The device determines that the affine inter-prediction is unidirectional inter-prediction or bidirectional inter-prediction. Based on the determination, the device applies the TwU or the TwB to the sub-block width, and applies the ThU or the ThB to the sub-block height. The device then derives a motion vector for the sub-block based on motion vectors for the current block, the sub-block width, and the sub-block height.

17 Claims, 8 Drawing Sheets

(51) Int. Cl.
*H04N 19/52* (2014.01)
*H04N 19/159* (2014.01)
*H04N 19/176* (2014.01)
*H04N 19/54* (2014.01)

(52) U.S. Cl.
CPC ........... *H04N 19/176* (2014.11); *H04N 19/52* (2014.11); *H04N 19/54* (2014.11)

(56) References Cited

U.S. PATENT DOCUMENTS

| | | | |
|---|---|---|---|
| 9,363,511 B2 * | 6/2016 | Zhang | H04N 19/11 |
| 9,510,012 B2 | 11/2016 | Liu et al. | |
| 9,769,472 B2 * | 9/2017 | Liu | H04N 19/105 |
| 9,788,019 B2 | 10/2017 | Liu et al. | |
| 9,813,726 B2 | 11/2017 | Liu et al. | |
| 10,440,384 B2 * | 10/2019 | Agyo | H04N 19/11 |
| 10,448,010 B2 * | 10/2019 | Chen | H04N 19/139 |
| 10,462,488 B1 * | 10/2019 | Li | H04N 19/105 |
| 10,506,251 B2 * | 12/2019 | Li | H04N 19/105 |
| 2014/0086323 A1 * | 3/2014 | Chuang | H04N 19/186 375/240.12 |
| 2014/0294078 A1 | 10/2014 | Seregin et al. | |
| 2015/0172707 A1 * | 6/2015 | Alshina | H04N 19/523 375/240.16 |
| 2015/0172719 A1 | 6/2015 | Guo et al. | |
| 2015/0229955 A1 | 8/2015 | Seregin et al. | |
| 2015/0365692 A1 | 12/2015 | Liu et al. | |
| 2016/0142706 A1 | 5/2016 | Chuang et al. | |
| 2017/0127081 A1 * | 5/2017 | Yoshikawa | H04N 19/20 |
| 2017/0272745 A1 * | 9/2017 | Liu | H04N 19/159 |
| 2017/0332095 A1 * | 11/2017 | Zou | H04N 19/124 |
| 2017/0353730 A1 * | 12/2017 | Liu | H04N 19/122 |
| 2017/0374369 A1 | 12/2017 | Chuang et al. | |
| 2018/0070102 A1 | 3/2018 | Zhang et al. | |
| 2018/0192069 A1 * | 7/2018 | Chen | H04N 19/52 |
| 2018/0205965 A1 * | 7/2018 | Chen | H04N 19/52 |
| 2018/0332298 A1 * | 11/2018 | Liu | H04N 19/51 |
| 2019/0104319 A1 * | 4/2019 | Zhang | H04N 19/176 |
| 2019/0208211 A1 * | 7/2019 | Zhang | H04N 19/109 |
| 2019/0335191 A1 * | 10/2019 | Kondo | H04N 19/52 |
| 2019/0349588 A1 * | 11/2019 | Chen | H04N 19/139 |
| 2019/0385276 A1 * | 12/2019 | Kondo | G06T 3/60 |

FOREIGN PATENT DOCUMENTS

| | | |
|---|---|---|
| CN | 105075259 A | 11/2015 |
| CN | 106303543 A | 1/2017 |
| CN | 106559669 A | 4/2017 |
| WO | 2016009587 A1 | 1/2016 |

OTHER PUBLICATIONS

Foreign Communication From a Counterpart Application, PCT Application No. PCT/CN2018/095910, English Translation of International Search Report dated Oct. 22, 2018, 6 pages.
Foreign Communication From a Counterpart Application, PCT Application No. PCT/CN2018/095910, English Translation of Written Opinion dated Oct. 22, 2018, 4 pages.
"Series H: Audiovisual and Multimedia Systems, Infrastructure of audiovisual services—Coding of moving video, High efficiency video coding," ITU-T, H.265, Dec. 2016, 664 pages.
Liu, S., et al., "Joint Temporal-Spatial Bit Allocation for Video Coding With Dependency," IEEE Transactions on Circuits and Systems for Video Technology, vol. 15, No. 1, Jan. 2005, pp. 15-26.
Liu, S., et al., "Hybrid global-local motion compensated frame interpolation for low bit rate video coding," J. Vis. Commun. Image R., vol. 14, 2003, pp. 61-79.
Liu, S., et al., "Global/Local Motion-Compensated Frame Interpolation for Low Bitrate Video," Image and Video Communications and Processing, vol. 3974, 2000, 12 pages.
Liu, S., et al., "Non-linear Motion-compensated Interpolation for Low Bit Rate Video," Applications of Digital Image Processing XXIII, vol. 4115, 2000, 11 pages.
Liu, S., et al., "MCI-embedded Motion Compensated Prediction for Quality Enhancement of Frame Interpolation," Multimedia Systems and Applications III, vol. 4209, Mar. 2001, 11 pages.
Liu, S., et al., "Joint Temporal-Spatial Rate Control with Approximating Rate-Distortion Models," Conference on Visual Communications and Image Processing, Jan. 20-25, 2002, 10 pages.
Liu, S., et al., Complexity Reduction of Joint Temporal-Spatial Bit Allocation Using R-D Models for Video Streaming, IEEE International Conference on Image Processing, Sep. 22-25, 2002, pp. 729-732.
Liu, S., et al., "Efficient MPEG-2 to MPEG-4 Video Transcoding," Conference on Image and Video Communications and Processing, Jan. 20-24, 2003, pp. 186-195.
Lou, J., et al., "Complexity and memory efficient GOP structures supporting VCR functionalities in H. 264/AVC," IEEE International Symposium on Circuits and Systems, 2008, pp. 636-639.
Lou J. et al., "Trick-Play Optimization for H.264 Video Decoding," Journal of Information Hiding and Multimedia Signal Processing, TR2010-076, Sep. 2010, 15 pages.
Liu, S., et al., "Joint Temporal-Spatial Rate Control for Adaptive Video Transcoding," IEEE International Conference on Multimedia and Expo, Jul. 6-9, 2003, 4 pages.
Zhang, X., et al., "Intra Mode Coding in HEVC Standard," Visual Communications and Image Processing, Jan. 2012, 6 pages.
Liu, S., et al., "Rectangular Partitioning for Intra Prediction in HEVC," Visual Communications and Image Processing, Jan. 2012, 6 pages.
Lai, P., et al., "Combined Temporal and Inter-layer Prediction for Scalable Video Coding using HEVC," Picture Coding Symposium, 2013, pp. 117-120.
Liu, S., et al., "Remove Partition Size N×N," JCTVC-D432, Jan. 20-28, 2011, 7 pages.
Liu, S., et al., "Evaluations and suggestions for TU representation," JCTVC-E083, WG11 No. m19597, Mar. 16-23, 2011, 8 pages.
Zhang, X., et al., "Method for deriving Chroma QP from Luma QP," JCTVC-F277, Jul. 14-22, 2011, 6 pages.
Liu, S., et al., "Rectangular (2N×N and N×2N) Intra Prediction," JCTVC-G135, WG11 No. 21687, Nov. 21-30, 2011, 6 pages.
Zhang, X., et al., "Method and syntax for quantization matrices representation," JCTVC-G152, Nov. 21-30, 2011, 8 pages.
Liu, S., et al., "Support of ChromaQPOffset in HEVC," JCTVC-G509r1, Nov. 21-30, 2011, 8 pages.
Oudin, S., et al., "Harmonization of the prediction and partitioning mode binarization of P and B slices," JCTVC-G1042, Nov. 21-30, 2011, 4 pages.
Cao, X., et al., "AHG16 Unification of SDIP and NSQT," JCTVC-H0347, Feb. 1-10, 2012, 9 pages.
Zhang, X., et al., "Non-CE6: Intra mode coding with fixed length binarization," JCTVC-H0435, WG11 No. m23311, Feb. 1-10, 2012, 5 pages.
Kim, J., et al., "nonTE5: Assigning intra prediction mode to inter layer intra predicted blocks in enhance layer," JCTVC-L0239, Jan. 14-23, 2013, 5 pages.
Lai, P., et al., "SCE3.4 Generalized Combined Prediction," JCTVC-M0221, Apr. 18-26, 2013, 9 pages.
Lai, P., et al., "Non-SCE3.4: Simplified Generalized Combined Prediction," JCTVC-M0222_r1, Apr. 18-26, 2013, 9 pages.
Seregin, V., et al., "Uni-prediction for combined inter mode," JCTVC-M0445, Apr. 18-26, 2013, 11 pages.
Xu, X., et al., "On unification of intra block copy and inter-picture motion compensation," JCTVC-Q0132, Jan. 9-17, 2014, 14 pages.
Xu, X., et al., "Non-CE2: Intra BC merge mode with default candidates," JCTVC-S0123, Oct. 17-24, 2014, 7 pages.
Xu, X., et al., "CE2 Test 3.2: Intra BC merge mode with default candidates," JCTVC-T0073, Feb. 10-18, 2015, 6 pages.

\* cited by examiner

US 10,609,384 B2

RESTRICTION ON SUB-BLOCK SIZE DERIVATION FOR AFFINE INTER PREDICTION

CROSS-REFERENCE TO RELATED APPLICATIONS

This patent application claims the benefit of U.S. Provisional Patent Application No. 62/561,603, filed Sep. 21, 2017, by Huanbang Chen, et al., and titled "Restriction On Sub-Block Size Derivation For Affine Inter-Prediction," which is hereby incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method comprising: selecting, by a processor at an encoder, a current block for sub-block based affine inter-prediction, the current block including a plurality of motion vectors; deriving, by the processor, a sub-block size for a sub-block of the current block, the sub-block size including a sub-block width and a sub-block height; determining, by the processor, a unidirectional width threshold (TwU), a bidirectional width threshold (TwB), a unidirectional height threshold (ThU), and a bidirectional height threshold (ThB), where a total value of TwB and ThB exceeds a total value of TwU and ThU; determining, by the processor, that the affine inter-prediction is unidirectional inter-prediction or bidirectional inter-prediction; based on the determination, applying, by the processor, the TwU or the TwB to the sub-block width; based on the determination, applying, by the processor, the ThU or the ThB to the sub-block height; deriving, by the processor, a motion vector for the sub-block based on motion vectors for the current block, the sub-block width, and the sub-block height; encoding, by the processor, prediction information for the sub-block in a bitstream, the prediction information based on the motion vector for the sub-block; and transmitting, by a transmitter coupled to the processor, the bitstream toward a decoder for decoding and display.

Optionally, in any of the preceding aspects, another implementation of the aspect includes, wherein the total value of TwB and ThB is greater than the total value of TwU and ThU to ensure a minimum sub-block size for bidirectional inter-prediction exceeds a minimum sub-block size for unidirectional inter-prediction.

Optionally, in any of the preceding aspects, another implementation of the aspect includes, wherein a value of TwB, a value of ThB, a value of TwU, and a value of ThU are predefined in a memory coupled to the processor.

Optionally, in any of the preceding aspects, another implementation of the aspect includes, further comprising encoding a value of TwB, a value of ThB, a value of TwU, a value of ThU, or combinations thereof, in a parameter set in the bitstream.

Optionally, in any of the preceding aspects, another implementation of the aspect includes, wherein the parameter set is a sequence parameter set (SPS), a picture parameter set (PPS), a slice header, or combinations thereof.

Optionally, in any of the preceding aspects, another implementation of the aspect includes, further comprising rounding the motion vector for the sub-block to a precision of one sixteenths accuracy.

Optionally, in any of the preceding aspects, another implementation of the aspect includes, wherein the sub-block size for the sub-block of the current block is derived according to:

$$\begin{cases} M = \text{clip3}\left(Tw, w, \frac{w \times MvPre}{\max(\text{abs}(v_{1x} - v_{0x}), \text{abs}(v_{1y} - v_{0y}))}\right) \\ N = \text{clip3}\left(Th, h, \frac{h \times MvPre}{\max(\text{abs}(v_{2x} - v_{0x}), \text{abs}(v_{2y} - v_{0y}))}\right) \end{cases}$$

where M is the sub-block width, N is the sub-block height, clip3 is a three parameter function that sets a first parameter as a lower threshold for a computation, a second parameter for an upper threshold for the computation, and a third parameter for the computation, Tw applies TwU or TwB, Th applies ThU or ThB, w is a width of the current block, h is a height of the current block, MvPre is a precision of the motion vector for the sub-block, max is a maximum function, abs is an absolute value function, and $v_{0x}$, $v_{1x}$, $v_{2x}$, $v_{0y}$, $v_{1y}$, and $v_{2y}$ are motion vector components in a motion vector field derived based on the motion vectors for the current block.

In an embodiment, the disclosure includes an apparatus comprising: a receiver to receive a bitstream; a processor coupled to the receiver and configured to: select a current block from the bitstream for decoding by sub-block based affine inter-prediction; obtain a plurality of motion vectors for the current block from the bitstream; derive a sub-block size for a sub-block of the current block, the sub-block size including a sub-block width and a sub-block height; determine a unidirectional width threshold (TwU), a bidirectional width threshold (TwB), a unidirectional height threshold (ThU), and a bidirectional height threshold (ThB), where a total value of TwB and ThB exceeds a total value of TwU and ThU; determine that the affine inter-prediction is unidirectional inter-prediction or bidirectional inter-prediction based on the bitstream; based on the determination, apply the TwU or the TwB to the sub-block width; based on the determination, apply the ThU or the ThB to the sub-block height; derive a motion vector for the sub-block based on motion vectors for the current block, the sub-block width, and the sub-block height; employ the motion vector for the sub-block to reconstruct the sub-block based on a reference frame; and forward a video sequence for display, the video sequence including the sub-block in a current frame.

Optionally, in any of the preceding aspects, another implementation of the aspect includes, wherein the total value of TwB and ThB is greater than the total value of TwU and ThU to ensure a minimum sub-block size for bidirectional inter-prediction exceeds a minimum sub-block size for unidirectional inter-prediction.

Optionally, in any of the preceding aspects, another implementation of the aspect includes, further comprising a memory coupled to the processor, the memory for to store a value of TwB, a value of ThB, a value of TwU, and a value of ThU as predefined values.

Optionally, in any of the preceding aspects, another implementation of the aspect includes, wherein the processor is further configured to obtain a value of TwB, a value of ThB, a value of TwU, a value of ThU, or combinations thereof, from a parameter set in the bitstream.

Optionally, in any of the preceding aspects, another implementation of the aspect includes, wherein the parameter set is a sequence parameter set (SPS), a picture parameter set (PPS), a slice header, or combinations thereof.

Optionally, in any of the preceding aspects, another implementation of the aspect includes, wherein the processor is further configured to round the motion vector for the sub-block to a precision of one sixteenths accuracy.

Optionally, in any of the preceding aspects, another implementation of the aspect includes, wherein the sub-block size for the sub-block of the current block is derived according to:

$$\begin{cases} M = \text{clip3}\left(Tw, w, \frac{w \times MvPre}{\max(\text{abs}(v_{1x} - v_{0x}), \text{abs}(v_{1y} - v_{0y}))}\right) \\ N = \text{clip3}\left(Th, h, \frac{h \times MvPre}{\max(\text{abs}(v_{2x} - v_{0x}), \text{abs}(v_{2y} - v_{0y}))}\right) \end{cases}$$

where M is the sub-block width, N is the sub-block height, clip3 is a three parameter function that sets a first parameter as a lower threshold for a computation, a second parameter for an upper threshold for the computation, and a third parameter for the computation, Tw applies TwU or TwB, Th applies ThU or ThB, w is a width of the current block, h is a height of the current block, MvPre is a precision of the motion vector for the sub-block, max is a maximum function, abs is an absolute value function, and $v_{0x}$, $v_{1x}$, $v_{2x}$, $v_{0y}$, $v_{1y}$, and $v_{2y}$ are motion vector components in a motion vector field derived based on the motion vectors for the current block.

In an embodiment, the disclosure includes a method comprising: receiving, by a receiver, a bitstream; selecting, by a processor, a current block from the bitstream for decoding by sub-block based affine inter-prediction; obtaining, by the processor, a plurality of motion vectors for the current block from the bitstream; deriving, by the processor, a sub-block size for a sub-block of the current block, the sub-block size including a sub-block width and a sub-block height; determining, by the processor, a unidirectional width threshold (TwU), a bidirectional width threshold (TwB), a unidirectional height threshold (ThU), and a bidirectional height threshold (ThB), where a total value of TwB and ThB exceeds a total value of TwU and ThU; determining, by the processor, that the affine inter-prediction is unidirectional inter-prediction or bidirectional inter-prediction based on the bitstream; based on the determination, applying, by the processor, the TwU or the TwB to the sub-block width; based on the determination, applying, by the processor, the ThU or the ThB to the sub-block height; deriving, by the processor, a motion vector for the sub-block based on motion vectors for the current block, the sub-block width, and the sub-block height; employing, by the processor, the motion vector for the sub-block to reconstruct the sub-block based on a reference frame; and forwarding, by the processor, a video sequence for display, the video sequence including the sub-block in a current frame.

Optionally, in any of the preceding aspects, another implementation of the aspect includes, wherein the total value of TwB and ThB is greater than the total value of TwU and ThU to ensure a minimum sub-block size for bidirectional inter-prediction exceeds a minimum sub-block size for unidirectional inter-prediction.

Optionally, in any of the preceding aspects, another implementation of the aspect includes, wherein a value of TwB, a value of ThB, a value of TwU, and a value of ThU are stored as predefined values.

Optionally, in any of the preceding aspects, another implementation of the aspect includes, further comprising obtaining a value of TwB, a value of ThB, a value of TwU, a value of ThU, or combinations thereof, from a parameter set in the bitstream.

Optionally, in any of the preceding aspects, another implementation of the aspect includes, further comprising round the motion vector for the sub-block to a precision of one sixteenths accuracy.

Optionally, in any of the preceding aspects, another implementation of the aspect includes, wherein the sub-block size for the sub-block of the current block is derived according to:

$$\begin{cases} M = \text{clip3}\left(Tw, w, \frac{w \times MvPre}{\max(\text{abs}(v_{1x} - v_{0x}), \text{abs}(v_{1y} - v_{0y}))}\right) \\ N = \text{clip3}\left(Th, h, \frac{h \times MvPre}{\max(\text{abs}(v_{2x} - v_{0x}), \text{abs}(v_{2y} - v_{0y}))}\right) \end{cases}$$

where M is the sub-block width, N is the sub-block height, clip3 is a three parameter function that sets a first parameter as a lower threshold for a computation, a second parameter for an upper threshold for the computation, and a third parameter for the computation, Tw applies TwU or TwB, Th applies ThU or ThB, w is a width of the current block, h is a height of the current block, MvPre is a precision of the motion vector for the sub-block, max is a maximum function, abs is an absolute value function, and $v_{0x}$, $v_{1x}$, $v_{2x}$, $v_{0y}$, $v_{1y}$, and $v_{2y}$ are motion vector components in a motion vector field derived based on the motion vectors for the current block.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
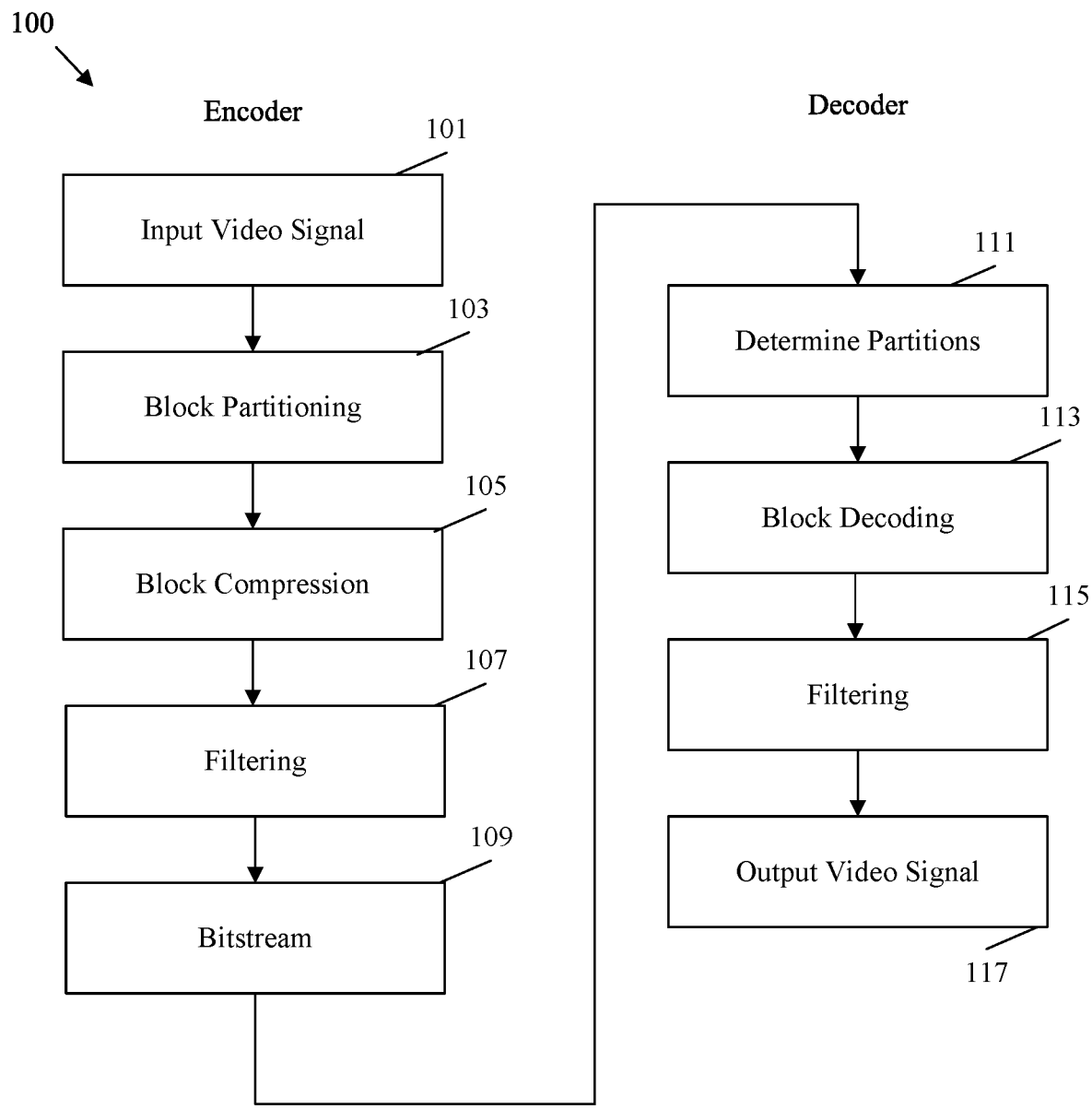
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding involves a combination of compression by inter-prediction and intra-prediction. The present disclosure focuses on increasing the coding efficiency of inter-prediction, which is a mechanism to encode the position of an object in a frame based on the position of the object in a different frame. For example, a motion vector can indicate a direction of movement of an object over time as depicted over multiple frames of a sequence of video. Hence, an object in a reference frame and a motion vector can be encoded and then employed by a decoder to partially reconstruct one or more frames that are temporally adjacent to the reference frame. Inter-prediction can employ unidirectional inter-prediction and/or bidirectional inter-prediction. Unidirectional inter-prediction uses a single motion vector to a single reference frame to predict the location of an object in a current frame. Bidirectional inter-prediction uses a preceding motion vector pointing towards a preceding reference frame and a subsequent motion vector pointing towards a subsequent reference frame.

Affine inter-prediction is a type of inter-prediction that is applied when an object visually changes shape between frames. For example, camera zooming in and/or out, rotations, perspective motion, and/or other irregular motion may cause an object to appear to change shape between frames. Affine inter-prediction distorts a reference frame so that the motion vectors point in the correct directions for the various sub-portions of the object. In formal terms, an affine transformation may preserve points, straight lines, planes, and/or parallel relationships between lines, while distorting angles between lines and distances between points. Affine inter-prediction may involve employing motion vectors for a current block to generate a motion vector field, partitioning a current block into plurality of sub-blocks based on motion vectors in the motion vector field, and then determining a motion vector for each sub-block based on the motion vector field. A minimum sub-block size may be predefined to prevent generation of a large number of sub-blocks. Even so, affine inter-prediction can be computationally intensive. Further, employing bidirectional inter-prediction when employing affine transforms can be particularly computationally intensive, for example when small sub-blocks are considered and/or employed.

Disclosed herein are mechanisms to mitigate the complexity of bidirectional affine inter-prediction. Sub-block size thresholds are employed to limit the size of the sub-blocks, but such thresholds are selected so that thresholds for bidirectional affine inter-prediction are greater than the thresholds for unidirectional affine inter-prediction. This reduces the number of sub-blocks for bidirectional affine inter-prediction, and hence mitigates the number of corresponding motion vectors and corresponding computational complexity at the encoder and/or at the encoder/decoder by linking the complexity of bidirectional affine inter-prediction to the complexity of unidirectional affine inter-prediction. For example, the sub-blocks may be divided to a width no smaller than a threshold width bidirectional (TwB) for purposes of bidirectional computation and no smaller than a threshold width unidirectional (TwU) for purposes of unidirectional computations. Further, the sub-blocks may be divided to a height no smaller than a threshold height bidirectional (ThB) for purposes of bidirectional computation and no smaller than a threshold height unidirectional (ThU) for purposes of unidirectional computations. The thresholds can be set in a relationship so that ThB is greater than ThU and/or TwB is greater than TwU. This ensures that the bidirectional affine inter-prediction sub-blocks are larger than unidirectional affine inter-prediction sub-blocks, which results in lowering the complexity of bidirectional affine inter-prediction relative to the complexity of unidirectional affine inter-prediction. The thresholds TwB, TwU, ThB, and/or ThU may be predefined and/or signaled in a parameter set in the bitstream, such as a sequence parameter set (SPS), a picture parameter set (PPS), and/or a slice header. Further, the motion vectors for the sub-blocks may be rounded to a 1/16 fractional accuracy to further reduce complexity in some examples.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be referred to as coding tree units in High Efficiency Video Coding (HEVC) (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artefacts so that the encoded file can be accurately reconstructed. Further, these filters mitigate artefacts in the reconstructed reference blocks so that artefacts are less likely to create additional artefacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artefacts. Once the frames are filtered, the video signal can be output to a display at step 117 for viewing by an end user.

The present disclosure relates to modifications to decrease the computational complexity of affine inter-prediction. Specifically, the present disclosure introduces sub-block size thresholds to correlate the complexity of bidirectional affine inter-prediction and unidirectional affine inter-prediction. Hence, the affine inter-prediction mechanisms described in the FIGS. below impact the operation of block compression at step 105 and block decoding at step 113.

Figure 2:
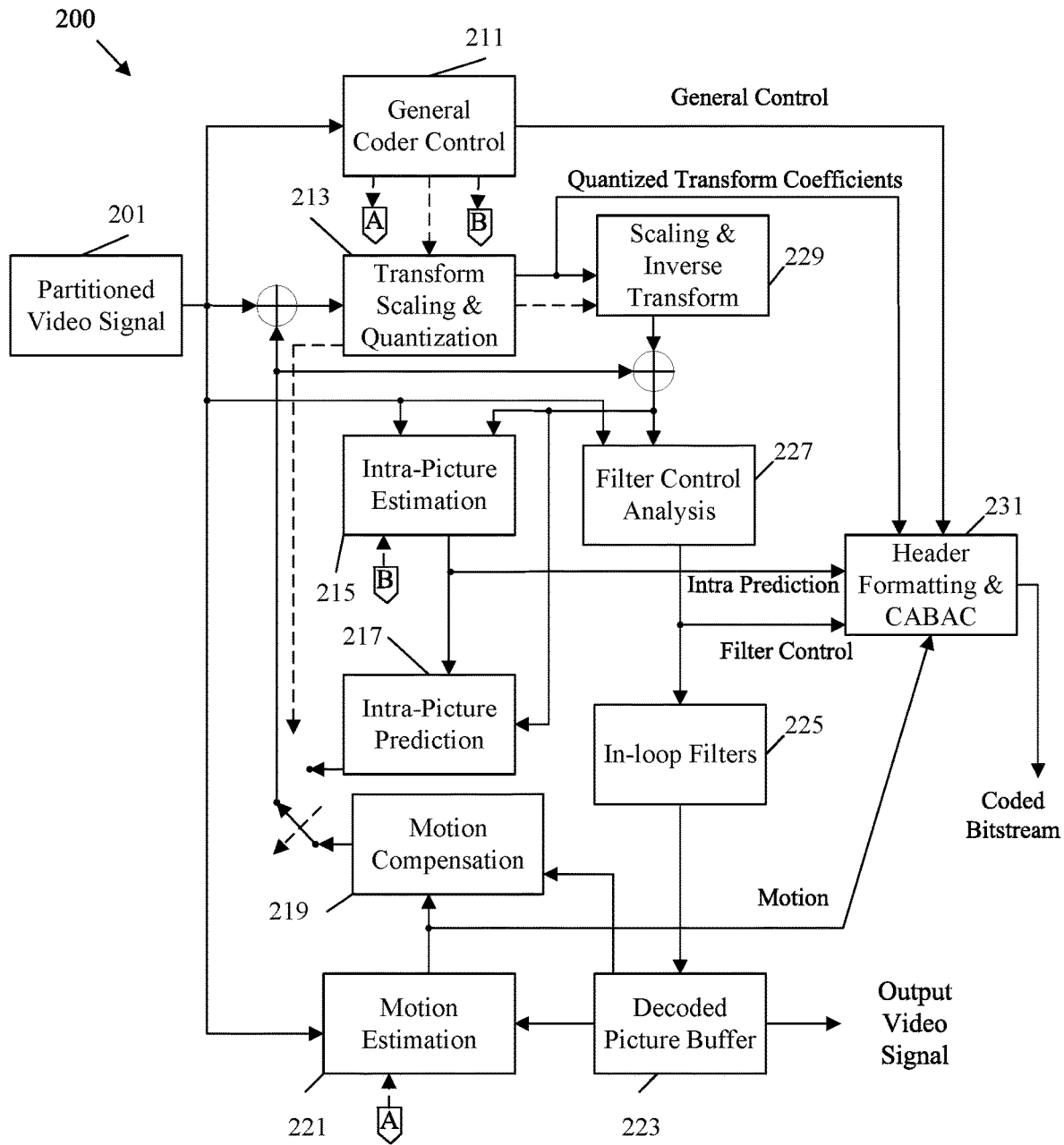
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filter component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a coding tree unit (CTU), coding tree blocks (CTBs), and CUs. For example, a CTU can be divided into CTBs, which can then be divided into CUs, which can be further sub-divided as desired. A CU can be encoded as a prediction unit (PU) containing prediction data and/or a transform unit (TU) containing transformed residual data for the CU. The motion estimation component 221 generates motion vectors, PUs, and TUs by using a rate-distortion analysis. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artefacts created during scaling, quantization, and transform. Such artefacts could otherwise cause inaccurate prediction (and create additional artefacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded be employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

The present disclosure relates to modifications to decrease the computational complexity of affine inter-prediction. Specifically, the present disclosure introduces sub-block size thresholds to correlate the complexity of bidirectional affine inter-prediction and unidirectional affine inter-prediction. Hence, the affine inter-prediction mechanisms described in the FIGS. below impact the operation of motion estimation component 221 and/or motion compensation component 219.

Figure 3:
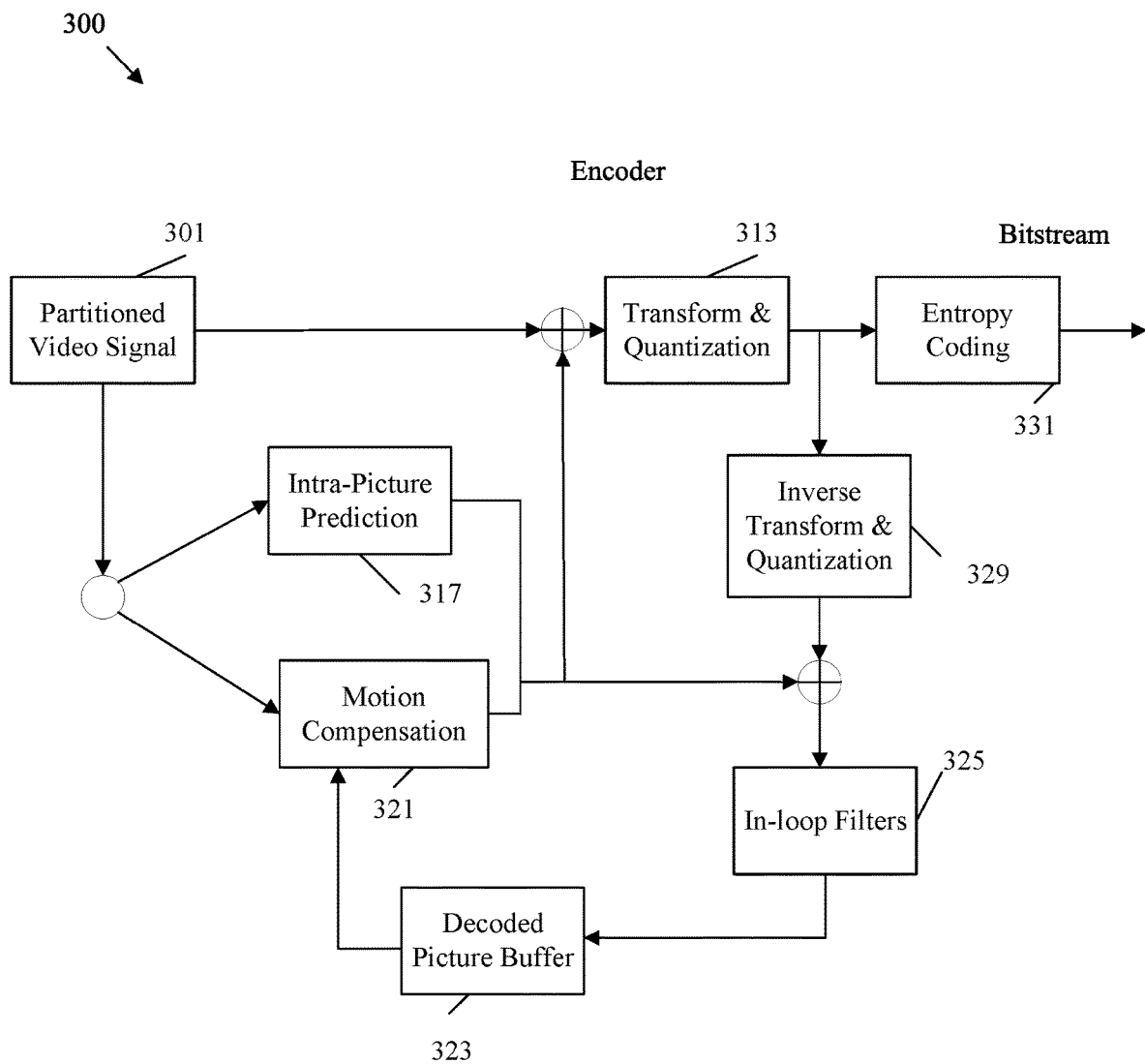
FIG. 3 is a schematic diagram illustrating an example video encoder that may implement affine inter-prediction.

FIG. 3 is a block diagram illustrating an example video encoder 300 that may implement affine inter-prediction. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

The following is a more detailed explanation of affine inter-prediction as applied by encoder 300 by employing the functionality described with respect to method 100 and codec system 200. Affine inter-prediction is a particular type of inter-prediction employed in encoding and decoding by step 105, step 113, motion compensation component 219, motion estimation component 221, and/or motion compensation component 321. Inter-prediction employs a motion vector and a reference block in a reference frame to encode blocks for one or more frames that are temporally adjacent to the reference frame. As discussed above, this allows an object to be coded with respect to the reference frame without recoding the object repeatedly for every frame. Affine inter-prediction is employed when an object visually changes shape between frames, which may occur due to camera zoom, camera rotations, perspective motion, and/or other irregular motion. When employing affine inter-prediction, the motion compensation component 321 distorts the reference frame in order to project the shape and location of the object in temporally adjacent frames.

As the reference frame is distorted by the affine inter-prediction process, the corresponding motion vectors vary across a block being encoded. The motion vectors for a current block can be described in terms of a motion vector field (MVF) generated based on control point motion vectors for the current block. The current block is subdivided into sub-blocks of sizes selected based on the MVF and then the motion vectors for the sub-blocks can be determined based on the MVF. The resulting motion vectors for the sub-blocks can be filtered and weighted by the motion compensation component 321 and/or the in-loop filters component 325 to generate prediction information (e.g., PUs) and residual information, which can be transformed and/or encoded by the transform and quantization component 313 and the entropy coding component 331, respectively.

For example, the motion compensation component 321 may first determine control point vectors for a current block, for example as part of a rate distortion optimization process. The motion compensation component 321 may also determine the MVF based on the control point vectors. The motion compensation component 321 may then determine the size of the various sub-blocks based on the motion vectors in the MVF. The motion compensation component 321 may then determine the relevant motion vector for each sub-block. The motion compensation component 321 may employ such a process as part of both a unidirectional inter-prediction and a bidirectional inter-prediction. For example, the motion compensation component 321 may attempt both unidirectional inter-prediction and bidirectional inter-prediction during rate distortion optimization and then select the approach that results in the best balance of coding size and video quality. In unidirectional prediction, a current block is predicted by a single reference frame, while in bidirectional prediction a current block is predicted by a temporally preceding reference frame and a temporally subsequent reference frame.

As can be appreciated by the discussion above, bidirectional affine inter-prediction is substantially more computationally intensive than unidirectional affine inter-prediction. However, many systems employ the same lower bound for both bidirectional affine inter-prediction and unidirectional affine inter-prediction. In contrast, motion compensation component 321 is modified to employ lower bound thresholds for sub-block sizes such that the lower bound thresholds for sub-block sizes in the bidirectional case are larger than the lower bound thresholds for sub-block sizes in the unidirectional case. This results in reducing the number of motion vector computations for the bidirectional case based on the number of motion vector computations in the unidirectional case, and hence reduces the complexity and/or the number of encoded motion vectors in a controllable manner. For example, the lower bound thresholds can be raised or lowered in tandem as desired based on the available computational resources at the encoder and/or based on the coding size the prediction block including the various motion vectors for the sub-blocks. This in turn reduces the encoding time, reduces computational resource requirements, and/or reduces coding sizes by reducing the number of sub-block motion vectors. In some examples, the lower bound thresholds for sub-block sizes are predefined, and in some examples the lower bound thresholds for sub-block sizes are forwarded in the bitstream for use at the decoder.

Figure 4:
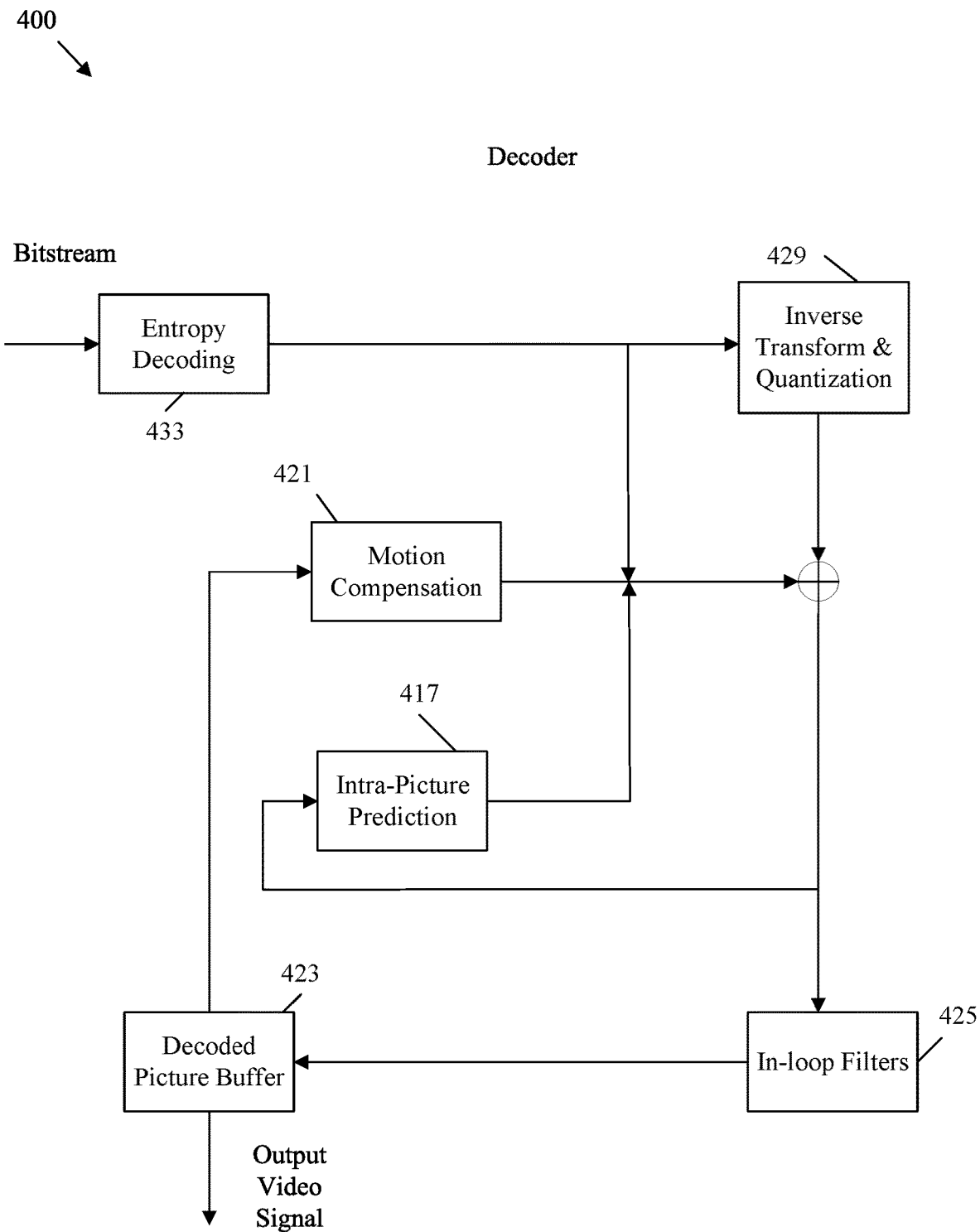
FIG. 4 is a schematic diagram illustrating an example video decoder that may implement affine inter-prediction.

FIG. 4 is a block diagram illustrating an example video decoder 400 that may implement affine inter-prediction. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

The following is a more detailed explanation of affine inter-prediction as applied by decoder 400 by employing the functionality described with respect to method 100 and codec system 200. Affine inter-prediction is applied by motion compensation component 421 as part of performing inter-prediction. For example, the motion compensation component 421 is configured to employ the prediction information in the bitstream to reconstruct current blocks. In some examples, the lower bound threshold sizes for the sub-blocks are signaled in the bitstream. In other cases, the lower bound threshold sizes are predefined and known to the decoder. The motion compensation component 421 can determine the MVF based on the control point motion vectors for the current block as coded in the bitstream. The motion compensation component 421 can also determine the sub-block size based on the MVF and the lower bound threshold sizes for the sub-blocks. The motion compensation component 421 can then determine motion vectors for the sub-blocks. The motion vectors for the sub-blocks can then be employed to interpret the prediction information in the bitstream in order to generate reconstructed frames for storage in the decoded picture buffer component 423 for display.

As with encoder 300, motion compensation component 421 is modified to employ lower bound thresholds for sub-block sizes such that the lower bound thresholds for sub-block sizes in the bidirectional case are larger than the lower bound thresholds for sub-block sizes in the unidirectional case. This in turn reduces the number of sub-blocks in the bidirectional case, and hence reduces the number of motion vector computations. Accordingly, the relationship between the lower bound thresholds for bidirectional affine inter-prediction and unidirectional affine inter-prediction reduces the decoding time, reduces computational resource requirements, and/or reduces coding sizes of the file received by the decoder by reducing the number of sub-block motion vectors.

Figure 5:
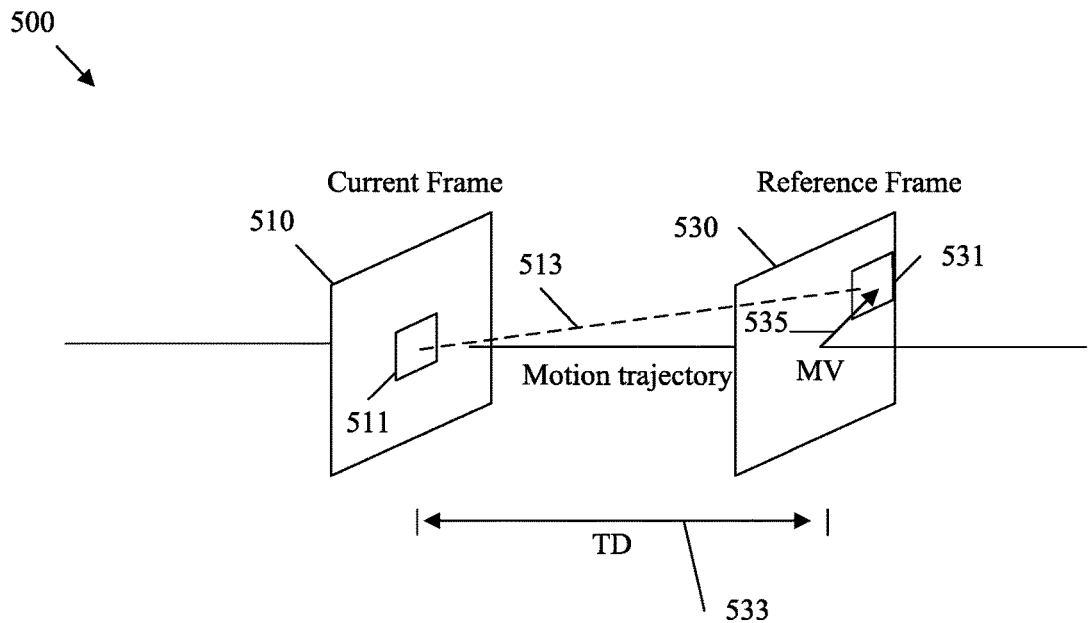
FIG. 5 is a schematic diagram illustrating an example of unidirectional inter-prediction.

FIG. 5 is a schematic diagram illustrating an example of unidirectional inter-prediction 500, for example as performed to determine motion vectors (MVs) at block compression step 105, block decoding step 113, motion estimation component 221, motion compensation component 219, motion compensation component 321, and/or motion compensation component 421. For example, unidirectional inter-prediction 500 can be employed to determine motion vectors for a block in inter-prediction modes and/or to determine motion vectors for sub-blocks in affine inter-prediction mode.

Unidirectional inter-prediction 500 employs a reference frame 530 with a reference block 531 to predict a current block 511 in a current frame 510. The reference frame 530 may be temporally positioned after the current frame 510 as shown, but may also be temporally positioned before the current frame 510 in some examples. The current frame 510 is an example frame/picture being encoded/decoded at a particular time. The current frame 510 contains an object in the current block 511 that matches an object in the reference block 531 of the reference frame 530. The reference frame 530 is a frame that is employed as a reference for encoding a current frame 510, and a reference block 531 is a block in the reference frame 530 that contains an object also contained in the current block 511 of the current frame 510.

The current block 511 is any coding unit that is being encoded/decoded at a specified point in the coding process. The current block 511 may be an entire partitioned block, or may be a sub-block in the affine inter-prediction case. The current frame 510 is separated from the reference frame 530 by some temporal distance (TD) 533. The TD 533 indicates an amount of time between the current frame 510 and the reference frame 530 in a video sequence. Over the time period represented by the TD 533, the object in the current block 511 moves from a position in the current frame 510 to another position in the reference frame 530 (e.g., the position of the reference block 531). For example, the object may move along a motion trajectory 513, which is a direction of movement of an object over time. A motion vector 535 describes the direction and magnitude of the movement of the object along the motion trajectory 513 over the TD 533. Accordingly, an encoded MV 535 and a reference block 531 provides information sufficient to reconstruct a current block 511 and position the current block 511 in the current frame 510. In the affine inter-prediction case, the object changes shape between the current frame 510 and the reference frame 530. Hence, the current block 511 is subdivided into sub-blocks that each include a corresponding MV 535, for example as defined by an MVF.

Figure 6:
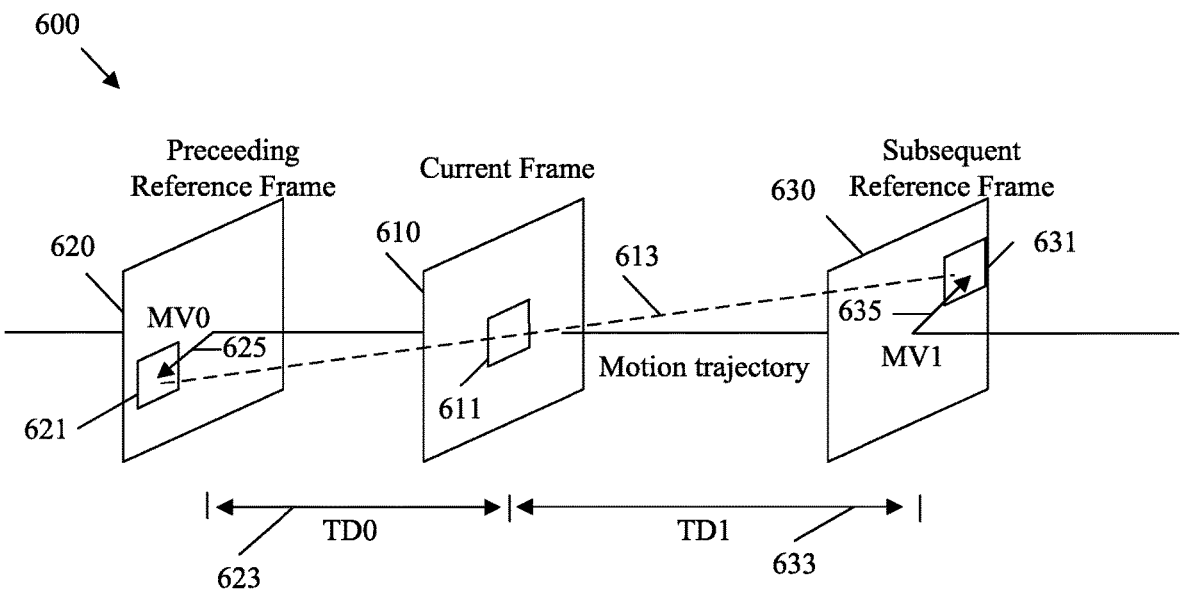
FIG. 6 is a schematic diagram illustrating an example of bidirectional inter-prediction.

FIG. 6 is a schematic diagram illustrating an example of bidirectional inter-prediction 600, for example as performed to determine MVs at block compression step 105, block decoding step 113, motion estimation component 221, motion compensation component 219, motion compensation component 321, and/or motion compensation component 421. For example, bidirectional inter-prediction 600 can be employed to determine motion vectors for a block in inter-prediction modes and/or to determine motion vectors for sub-blocks in affine inter-prediction mode.

Bidirectional inter-prediction 600 is similar to unidirectional inter-prediction 500, but employs a pair of reference frames to predict a current block 611 in a current frame 610. Hence current frame 610 and current block 611 are substantially similar to current frame 510 and current block 511, respectively. The current frame 610 is temporally positioned between a preceding reference frame 620, which occurs before the current frame 610 in the video sequence, and a subsequent reference frame 630, which occurs after the current frame 610 in the video sequence. Preceding reference frame 620 and subsequent reference frame 630 are otherwise substantially similar to reference frame 530.

The current block 611 is matched to a preceding reference block 621 in the preceding reference frame 620 and to a subsequent reference block 631 in the subsequent reference frame 630. Such a match indicates that, over the course of the video sequence, an object moves from a position at the preceding reference block 621 to a position at the subsequent reference block 631 along a motion trajectory 613 and via the current block 611. The current frame 610 is separated from the preceding reference frame 620 by some preceding temporal distance (TD0) 623 and separated from the subsequent reference frame 630 by some subsequent temporal distance (TD1) 633. The TD0 623 indicates an amount of time between the preceding reference frame 620 and the current frame 610 in the video sequence. The TD1 633 indicates an amount of time between the current frame 610 and the subsequent reference frame 630 in the video sequence. Hence, the object moves from the preceding reference block 621 to the current block 611 along the motion trajectory 613 over a time period indicated by TD0 623. The object also moves from the current block 611 to the subsequent reference block 631 along the motion trajectory 613 over a time period indicated by TD1 633.

A preceding motion vector (MV0) 625 describes the direction and magnitude of the movement of the object along the motion trajectory 613 over the TD0 623 (e.g., between the preceding reference frame 620 and the current frame 610). A subsequent motion vector (MV1) 635 describes the direction and magnitude of the movement of the object along the motion trajectory 613 over the TD1 633 (e.g., between the current frame 610 and the subsequent reference frame 630). As such, in bidirectional inter-prediction 600, the current block 611 can be coded and reconstructed by employing the preceding reference block 621 and/or the subsequent reference block 631, MV0 625, and MV1 635.

As can be appreciated by the above discussion, bidirectional inter-prediction 600 calculates twice the number of motion vectors than unidirectional inter-prediction 500 for each block. In the affine inter-prediction context, the current block is divided into sub-blocks and corresponding motion vectors are determined for each sub-block. Accordingly, bidirectional inter-prediction 600 determines twice the number of motion vectors per sub-block when compared to unidirectional inter-prediction 500. Hence, bidirectional inter-prediction 600 becomes progressively more computationally complex than unidirectional inter-prediction 500 as the size of the sub-blocks decreases and the total number of sub-blocks increase. This problem can be addressed by providing different lower bounds of sub-block size for unidirectional inter-prediction 500 and bidirectional inter-prediction 600. For example, the lower threshold for sub-block size can be set higher in bidirectional inter-prediction 600 than in unidirectional inter-prediction 500. This results in fewer total sub-blocks (e.g., current blocks 611) in the bidirectional inter-prediction 600 case than the corresponding number of sub-blocks (e.g., current blocks 511) in unidirectional inter-prediction 500 case. Employing different lower thresholds for sub-block sizes in this manner reduces the complexity of affine bidirectional inter-prediction 600 relative to affine unidirectional inter-prediction 500. The mechanism for implementing such thresholds on sub-block size is discussed with respect to the FIGS below.

Figure 7:
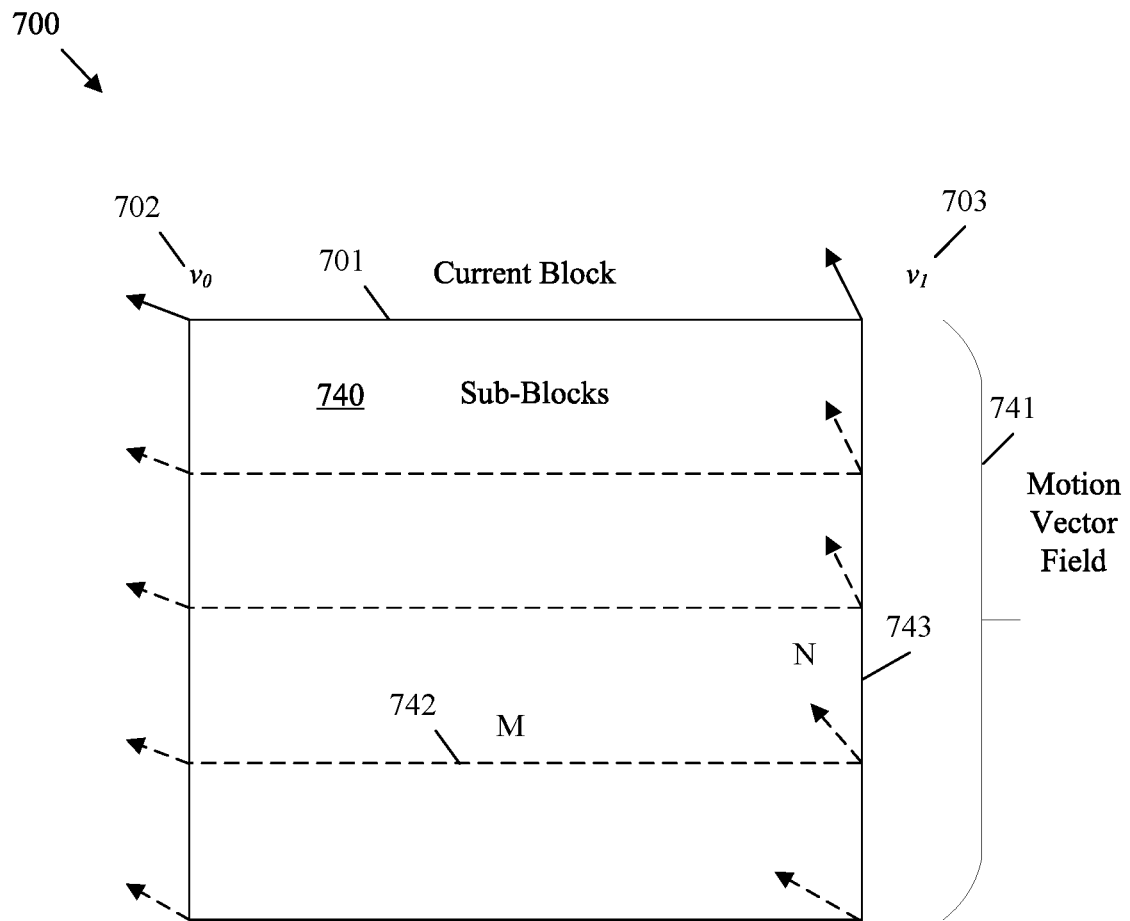
FIG. 7 is a schematic diagram illustrating an example of an affine motion model for affine inter-prediction.

FIG. 7 is a schematic diagram illustrating an example of an affine motion model 700 for affine inter-prediction. Affine motion model 700 may be used for both unidirectional inter-prediction 500 and bidirectional inter-prediction 600. Hence, affine motion model 700 can be applied to determine motion vectors at block compression step 105, block decoding step 113, motion estimation component 221, motion compensation component 219, motion compensation component 321, and/or motion compensation component 421.

As noted above, affine inter-prediction distorts the reference frame(s) so that a current block 701 can be predicted despite certain shape changes while the corresponding object moves between the corresponding frames. Accordingly, the motion vectors for a current block 701 vary across the current block 701. The motion vectors for the current block 701 are described in terms of control point motion vector v0 702 positioned at the top left corner of the current block 701 and control point motion vector v1 703 positioned at the top right corner of the current block 701. v0 702 and v1 703 contain horizontal (x) components and vertical (y) components that indicate the magnitude of the vectors. Hence, v0 702 can be described as (v0x, v0y) and v1 703 can be described as (v1x, v1y), respectively. v0 702 and v1 703 can be employed to determine an MVF 741 for the entire current block 701. The MVF 741 is a field of vectors that change based on position. A simplified example of the MVF 741 is depicted by dashed arrows calculated from v0 702 and v1 703.

As a particular example, the MVF 741 can be determined according to Equation 1 below:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Equation 1}$$

where $v_x$ is the horizontal magnitude of the vector for a pixel, $v_y$ is the vertical magnitude of the vector for the pixel, x and y describe the horizontal and vertical position of the pixel, w is the width of the current block 701, $v_{0x}$ is the horizontal magnitude of $v_0$ 702, $v_{0y}$ is the vertical magnitude of $v_0$ 702, $v_{1x}$ is the horizontal magnitude of $v_1$ 703, and $v_{1y}$ is the vertical magnitude of $v_1$ 703.

By employing Equation 1, the motion vector for any position in the current block can be determined. As the current block 701 includes different motion vectors at different positions, the current block 701 is divided into sub-blocks 740. The sub-blocks 740 include a size described by a sub-block width M 742 and sub-block height N 743. The sub-blocks 740 size can be determined according to the vectors in the MVF 741. For example, the sub-block size (e.g., sub-block width M 742 and sub-block height N 743) for the sub-block 740 of the current block 701 can be derived according to Equation 2 below.

$$\begin{cases} M = \text{clip3}\left(Tw, w, \frac{w \times MvPre}{\max(\text{abs}(v_{1x} - v_{0x}), \text{abs}(v_{1y} - v_{0y}))}\right) \\ N = \text{clip3}\left(Th, h, \frac{h \times MvPre}{\max(\text{abs}(v_{2x} - v_{0x}), \text{abs}(v_{2y} - v_{0y}))}\right) \end{cases} \quad \text{Equation 2}$$

where M is the sub-block width 742, N is the sub-block height 743, clip3 is a three parameter function that sets a first parameter as a lower threshold for a computation, a second parameter for an upper threshold for the computation, and a third parameter for the computation, Tw applies a sub-block width threshold, Th applies a sub-block height threshold, w is a width of the current block, h is a height of the current block, MvPre is a precision of the motion vector for the sub-block, max is a maximum function, abs is an absolute value function, and $v_{0x}$, $v_{1x}$, $v_{2x}$, $v_{0y}$, $v_{1y}$, and $v_{2y}$ are motion vector components in an MVF 741 derived based on the control point motion vectors for the current block 701. For example, ($v_{0x}$, $v_{0y}$) is the top left control point motion vector of the current block 701, ($v_{1x}$, $v_{1y}$) is the top right control point motion vector of the current block 701, and ($v_{2x}$, $v_{2y}$) is a bottom left control point motion vector of the current block 701 determined from the MVF 741 according to Equation 1.

As a particular example, MvPre can be set to round the motion vectors for the sub-blocks 740 to a precision of one sixteenths accuracy. Further, Tw and Th can be employed to set a lower bound threshold on sub-block 740 width M 742 and height N 743. For example, Tw can be set to TwU when unidirectional inter-prediction is employed or TwB when bidirectional inter-prediction is employed. Further, Th can be set to ThU when unidirectional inter-prediction is employed or ThB when bidirectional inter-prediction is employed. Hence, Equation 2 can be employed to set different sub-block size thresholds for bidirectional affine inter-prediction and for unidirectional affine inter-prediction. Further the total value of TwB and ThB can be set to a value that is greater than the total value of TwU and ThU in order to ensure a minimum sub-block size for bidirectional inter-prediction exceeds a minimum sub-block size for unidirectional inter-prediction. In another example, the value of TwB is greater than TwU and the value of ThB is greater than the value of ThU. Setting TwU, ThU, TwB, and ThB as described results in fewer sub-blocks 740 when bidirectional affine inter-prediction is used than when unidirectional affine inter-prediction is used. The value of TwB, value of ThB, value of TwU, and/or value of ThU can be predefined in a memory at both the encoder and the decoder in some examples. In other examples, the value of TwB, value of ThB, value of TwU, and/or value of ThU can be determined by the encoder and signaled to the decoder in the bitstream, for example in a parameter set such as a SPS, PPS, and/or slice header. For example TwU, ThU, TwB, and/or ThB can be set to such values as sixteen, eight, four, two, one, etc.

M 742 and N 743 can be adjusted to lower values in order to make M 742 and N 743 a divisor of the width and height, respectively, of the current block 701. Once the sub-block 740 size is determined, motion vectors can be determined for each sub-block 740 based on the MVF 741. For example, the MVF 741 can be solved for a sample of the current block 701 at the center of each sub-block 740. This results in motion vectors for each sub-block 740 located at the center sample of each sub-block. Such motion vectors can be rounded to a specified accuracy (e.g., $1/16$ fractional accuracy). Interpolation filters can then be applied to generate prediction information for each sub-block within the derived motion vector (e.g., when implemented at an encoder). Further, when such motion vectors are derived at a decoder, the sub-block 740 size and motion vectors can be employed to interpret other signaled prediction information, such as to reconstruct a current block 701 based on a reference block and signaled control point motion vectors etc.

Figure 8:
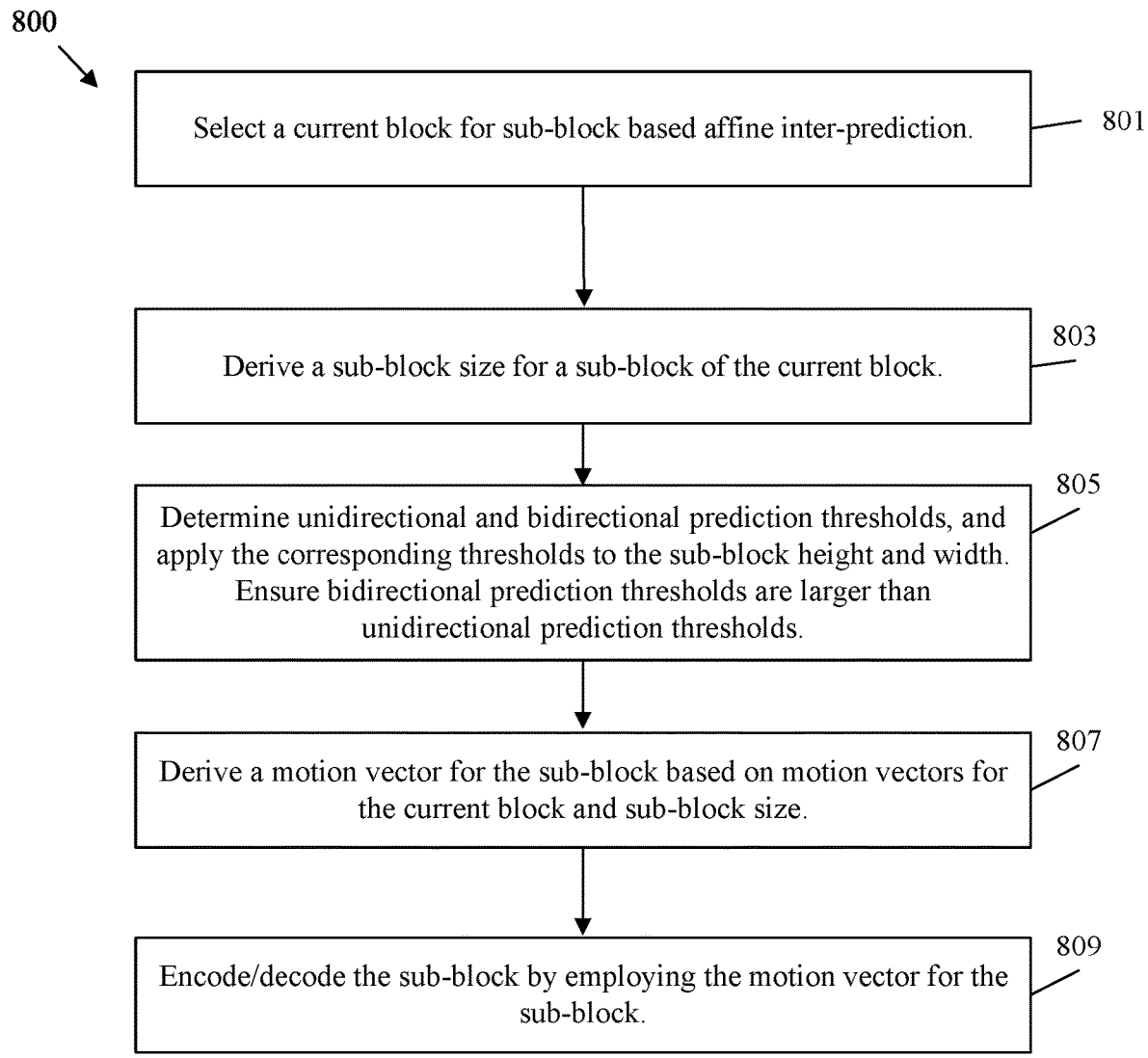
FIG. 8 is a flowchart of an example method of deriving a sub-block size for use in affine inter-prediction.

FIG. 8 is a flowchart of an example method 800 of deriving a sub-block size for use in affine inter-prediction, such as unidirectional inter-prediction 500 and/or bidirectional inter-prediction 600 employing affine motion model 700. Hence, method 800 can be employed to determine motion vectors at block compression step 105, block decoding step 113, in motion estimation component 221, in motion compensation component 219, in motion compensation component 321, and/or in motion compensation component 421.

Method 800 may be implemented at an encoder or a decoder, depending on the example. When operating on an encoder, method 800 may be initiated when the encoder begins to encode a current block based on one or more reference frames. When operating on a decoder, method 800 may be initiated when the decoder begins to decode a current block based on control point motion vectors for the current block (e.g., sub-block motion vectors have been omitted from the bitstream to reduce the size of the encoding).

At step 801, the current block is selected for sub-block based affine inter-prediction. As noted above, affine inter-prediction is employed when an object moving between a reference block and the current block changes shape (e.g., due to certain types of camera motion). In order to predict the current block, the reference block(s) are distorted. Hence, the current block includes a plurality of control point motion vectors that can be used to describe an MVF that includes motion vectors that account for such distortion at various positions across the current block.

At step 803, a sub-block size is derived for sub-blocks of the current block. The sub-block size includes a sub-block width M and a sub-block height N, as shown in FIG. 7. The sub-block size may be derived by employing Equation 2 as discussed above.

At step 805, a TwU, a TwB, a ThU, and a ThB are determined. When method 800 operates on an encoder, such values may be predefined values in memory or may be selected based on a rate distortion optimization process. When such values are selected at run time, TwU, TwB, ThU, and/or ThB can be encoded and signaled to the decoder in a parameter set in the bitstream. Correspondingly, when the values are predefined, the decoder may obtain them from memory. Otherwise, the decoder can obtain TwU, TwB, ThU, and/or ThB from the corresponding parameter set in the bitstream. Regardless of how such values are obtained/communicated, the total value of TwB and ThB exceeds the total value of TwU and ThU. In some examples, the value of TwB exceeds the value of TwU and the value of ThB exceeds the value of ThU, respectively. Once the thresholds are obtained, the method 800 determines whether the affine inter-prediction is unidirectional inter-prediction or bidirectional inter-prediction and applies the relevant thresholds to the sub-block size.

For example, when the affine inter-prediction is unidirectional inter-prediction, TwU is applied to the sub-block width M and ThU is applied to the sub-block height N. Accordingly, when N is calculated to be smaller than ThU, N is set to ThU instead. Also, when M is calculated to be smaller than TwU, M is set to TwU instead. Further, when the affine inter-prediction is bidirectional inter-prediction, TwB is applied to the sub-block width M and ThB is applied to the sub-block height N. Accordingly, when N is calculated to be smaller than ThB, N is set to ThB instead. Also, when M is calculated to be smaller than TwB, M is set to TwB instead. Such thresholds can be applied by including TwU or TwB for Tw and ThU or ThB for Th, respectively, in Equation 2. Due to the relationship between the unidirectional thresholds and the bidirectional thresholds, the bidirectional case employs larger sub-blocks than the unidirectional case. This reduces the number of sub-blocks as well as the computational complexity of the bidirectional case based on the computational complexity of the unidirectional case. As such, the total value of TwB and ThB is greater than the total value of TwU and ThU to ensure a minimum sub-block size for bidirectional inter-prediction exceeds a minimum sub-block size for unidirectional inter-prediction.

At step 807, motion vectors are derived for each of the sub-blocks based on the control point motion vectors for the current block, the sub-block width, and the sub-block height. For example, the sub-block width and height are employed to partition the current blocks into a set of sub-blocks. Equation 1 can be employed to determine the MVF based on the control point motion vectors for the current block. The center sample for each sub-block can be inserted into Equation 1 to determine the motion vector for the corresponding sub-block. The motion vector for the sub-blocks may be rounded to a precision of one sixteenths accuracy in some examples.

At step 809, the sub-blocks are encoded or decoded, depending on the example, by employing the motion vectors for the sub-blocks. For example, in the encoder case, prediction information can be determined for each of the sub-blocks based on the motion vector for the sub-blocks determined at step 807. In some cases, this involves applying motion compensation interpolation filters to the derived motion vectors for each sub-block to generate the prediction information for the current block. Such prediction information can then be encoded in the bitstream and later transmitted in the bitstream toward a decoder for decoding and display. As another example, in the decoder case, the motion vectors for the sub-blocks can be employed to reconstruct each of the sub-blocks in the current block based on reference block(s) in reference frame(s). This may also involve applying motion compensation interpolation filters to the derived motion vectors for each sub-block. Such derived motion vectors can then be employed in conjunction with other prediction information and/or residual information to reconstruct the current block. The current block, including the sub-blocks, can then be positioned in a current frame, which is in turn positioned in a video sequence. The video sequence can then be forwarded to a display unit for display.

Figure 9:
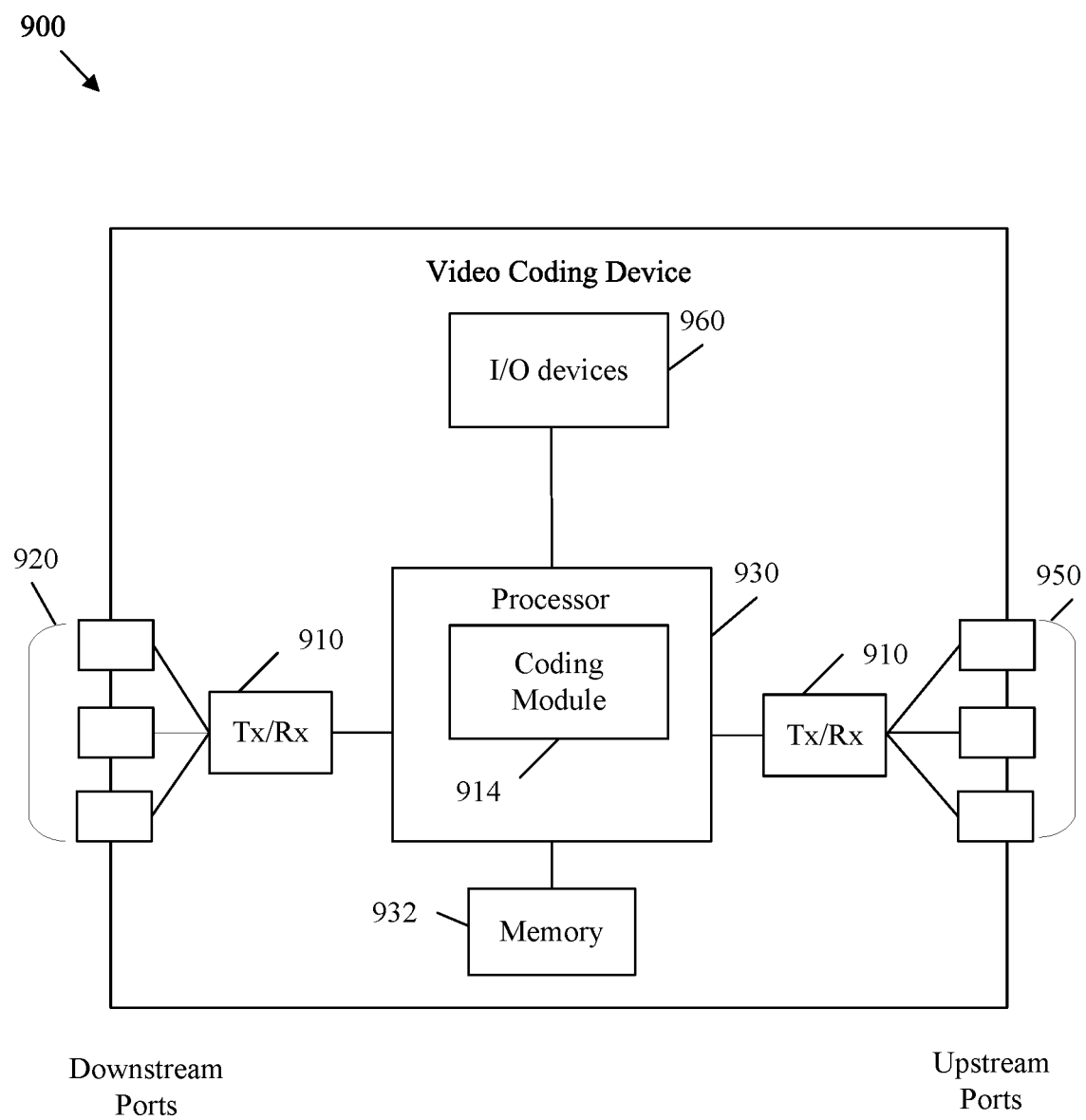
FIG. 9 is a schematic diagram of an example video coding device.

FIG. 9 is a schematic diagram of an example video coding device 900 according to an embodiment of the disclosure. The video coding device 900 is suitable for implementing the disclosed examples/embodiments as described herein. The video coding device 900 comprises downstream ports 920, upstream ports 950, and/or transceiver units (Tx/Rx) 910, including transmitters and/or receivers for communicating data upstream and/or downstream over a network. The video coding device 900 also includes a processor 930 including a logic unit and/or central processing unit (CPU) to process the data and a memory 932 for storing the data. The video coding device 900 may also comprise optical-to-electrical (OE) components, electrical-to-optical (EO) components, and/or wireless communication components coupled to the upstream ports 950 and/or downstream ports 920 for communication of data via optical or wireless communication networks. The video coding device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc. and/or corresponding interfaces for interacting with such output devices.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the downstream ports 920, Tx/Rx 910, upstream ports 950, and memory 932. The processor 930 comprises a coding module 914. The coding module 914 implements the disclosed embodiments described above, such as methods 100, and/or 800, unidirectional inter-prediction 500, bidirectional inter-prediction 600, affine motion model 700, and/or any other method/mechanism described herein. Further, the coding module 914 may implement a codec system 200, an encoder 300, and/or a decoder 400. Accordingly, coding module 914 can be employed to determine sub-block size in bidirectional affine inter-prediction and unidirectional affine inter-prediction, and apply sub-block size thresholds prior to determining motion vectors for the sub-blocks. The coding module 914 can also be employed to ensure that the minimum size thresholds are larger for bidirectional affine inter-prediction sub-blocks than for unidirectional affine inter-prediction sub-blocks. The inclusion of the coding module 914 therefore provides a substantial improvement to the functionality of the video coding device 900, by reducing the number of sub-blocks for bidirectional affine inter-prediction, and hence reducing the complexity of bidirectional affine inter-prediction based on the complexity of the unidirectional affine inter-prediction. Further, coding module 914 effects a transformation of the video coding device 900 to a different state. Alternatively, the coding module 914 can be implemented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution.

The disclosure includes a video encoder comprising: a processing means for selecting a current block for sub-block based affine inter-prediction, the current block including a plurality of motion vectors; deriving a sub-block size for a sub-block of the current block, the sub-block size including a sub-block width and a sub-block height; determining a unidirectional width threshold (TwU), a bidirectional width threshold (TwB), a unidirectional height threshold (ThU), and a bidirectional height threshold (ThB), where a total value of TwB and ThB exceeds a total value of TwU and ThU; determining that the affine inter-prediction is unidirectional inter-prediction or bidirectional inter-prediction; based on the determination, applying the TwU or the TwB to the sub-block width; based on the determination, applying the ThU or the ThB to the sub-block height; deriving a motion vector for the sub-block based on motion vectors for the current block, the sub-block width, and the sub-block height; and encoding prediction information for the sub-block in a bitstream, the prediction information based on the motion vector for the sub-block; and a transmitting means for transmitting the bitstream toward a decoder for decoding and display.

The disclosure also includes a video decoder comprising: a receiving means for receiving a bitstream; and a processing means for selecting a current block from the bitstream for decoding by sub-block based affine inter-prediction; obtaining a plurality of motion vectors for the current block from the bitstream; deriving a sub-block size for a sub-block of the current block, the sub-block size including a sub-block width and a sub-block height; determining a unidirectional width threshold (TwU), a bidirectional width threshold (TwB), a unidirectional height threshold (ThU), and a bidirectional height threshold (ThB), where a total value of TwB and ThB exceeds a total value of TwU and ThU; determining that the affine inter-prediction is unidirectional inter-prediction or bidirectional inter-prediction based on the bitstream; based on the determination, applying the TwU or the TwB to the sub-block width; based on the determination, applying the ThU or the ThB to the sub-block height; deriving a motion vector for the sub-block based on motion vectors for the current block, the sub-block width, and the sub-block height; employing the motion vector for the sub-block to reconstruct the sub-block based on a reference frame; and forwarding a video sequence for display, the video sequence including the sub-block in a current frame.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method comprising:
   selecting, by a processor at an encoder, a current block for sub-block based affine inter-prediction, the current block associated with a plurality of motion vectors;
   deriving, by the processor, a sub-block size for a sub-block of the current block, the sub-block size including a sub-block width and a sub-block height;
   determining, by the processor, a unidirectional width threshold (TwU), a bidirectional width threshold (TwB), a unidirectional height threshold (ThU), and a bidirectional height threshold (ThB), wherein a total value of TwB and ThB exceeds a total value of TwU and ThU, and wherein the total value of TwB and ThB is greater than the total value of TwU and ThU to ensure a minimum sub-block size for bidirectional inter-prediction exceeds a minimum sub-block size for unidirectional inter-prediction;
   determining, by the processor, that the affine inter-prediction is unidirectional inter-prediction or bidirectional inter-prediction;
   based on the determination of unidirectional inter-prediction or bidirectional inter-prediction, applying, by the processor, the TwU or the TwB to the sub-block width;
   based on the determination, applying, by the processor, the ThU or the ThB to the sub-block height;
   deriving, by the processor, a motion vector for the sub-block based on motion vectors for the current block, the sub-block width, and the sub-block height;
   encoding, by the processor, prediction information for the sub-block in a bitstream, the prediction information based on the motion vector for the sub-block; and
   transmitting, by a transmitter coupled to the processor, the bitstream toward a decoder for decoding and display.

2. The method of claim 1, wherein a value of TwB, a value of ThB, a value of TwU, and a value of ThU are predefined in a memory coupled to the processor.

3. The method of claim 1, further comprising encoding a value of TwB, a value of ThB, a value of TwU, a value of ThU, or combinations thereof, in a parameter set in the bitstream.

4. The method of claim 3, wherein the parameter set is a sequence parameter set (SPS), a picture parameter set (PPS), a slice header, or combinations thereof.

5. The method of claim 1, further comprising rounding the motion vector for the sub-block to a precision of one sixteenths accuracy.

6. The method of claim 1, wherein the sub-block size for the sub-block of the current block is derived according to:

$$\begin{cases} M = \text{clip3}\left(Tw, w, \frac{w \times MvPre}{\max(\text{abs}(v_{1x} - v_{0x}), \text{abs}(v_{1y} - v_{0y}))}\right) \\ N = \text{clip3}\left(Th, h, \frac{h \times MvPre}{\max(\text{abs}(v_{2x} - v_{0x}), \text{abs}(v_{2y} - v_{0y}))}\right) \end{cases}$$

where M is the sub-block width, N is the sub-block height, clip3 is a three parameter function that sets a first parameter as a lower threshold for a computation, a second parameter for an upper threshold for the computation, and a third parameter for the computation, Tw applies TwU or TwB, Th applies ThU or ThB, w is a width of the current block, h is a height of the current block, MvPre is a precision of the motion vector for the sub-block, max is a maximum function, abs is an absolute value function, and $v_{0x}$, $v_{1x}$, $v_{2x}$, $v_{0y}$, $v_{1y}$, and $v_{2y}$ are motion vector components in a motion vector field derived based on the motion vectors for the current block.

7. An apparatus comprising:
   a receiver to receive a bitstream;
   a processor coupled to the receiver and configured to:
     select a current block from the bitstream for decoding by sub-block based affine inter-prediction;
     obtain a plurality of motion vectors for the current block from the bitstream;
     derive a sub-block size for a sub-block of the current block, the sub-block size including a sub-block width and a sub-block height;
     determine a unidirectional width threshold (TwU), a bidirectional width threshold (TwB), a unidirectional height threshold (ThU), and a bidirectional height threshold (ThB), wherein a total value of TwB and ThB exceeds a total value of TwU and ThU, and wherein the total value of TwB and ThB is greater than the total value of TwU and ThU to ensure a minimum sub-block size for bidirectional inter-prediction exceeds a minimum sub-block size for unidirectional inter-prediction;
     determine that the affine inter-prediction is unidirectional inter-prediction or bidirectional inter-prediction based on the bitstream;
     based on the determination of unidirectional inter-prediction or bidirectional inter-prediction, apply the TwU or the TwB to the sub-block width;
     based on the determination, apply the ThU or the ThB to the sub-block height;
     derive a motion vector for the sub-block based on motion vectors for the current block, the sub-block width, and the sub-block height;
     employ the motion vector for the sub-block to reconstruct the sub-block based on a reference frame; and
     forward a video sequence for display, the video sequence including the sub-block in a current frame.

8. The apparatus of claim 7, further comprising a memory coupled to the processor, the memory configured to store a value of TwB, a value of ThB, a value of TwU, and a value of ThU as predefined values.

9. The apparatus of claim 7, wherein the processor is further configured to obtain a value of TwB, a value of ThB, a value of TwU, a value of ThU, or combinations thereof, from a parameter set in the bitstream.

10. The apparatus of claim 9, wherein the parameter set is a sequence parameter set (SPS), a picture parameter set (PPS), a slice header, or combinations thereof.

11. The apparatus of claim 7, wherein the processor is further configured to round the motion vector for the sub-block to a precision of one sixteenths accuracy.

12. The apparatus of claim 7, wherein the sub-block size for the sub-block of the current block is derived according to:

$$\begin{cases} M = \text{clip3}\left(Tw, w, \frac{w \times MvPre}{\max(\text{abs}(v_{1x} - v_{0x}), \text{abs}(v_{1y} - v_{0y}))}\right) \\ N = \text{clip3}\left(Th, h, \frac{h \times MvPre}{\max(\text{abs}(v_{2x} - v_{0x}), \text{abs}(v_{2y} - v_{0y}))}\right) \end{cases}$$

where M is the sub-block width, N is the sub-block height, clip3 is a three parameter function that sets a first parameter as a lower threshold for a computation, a second parameter for an upper threshold for the computation, and a third parameter for the computation, Tw applies TwU or TwB, Th applies ThU or ThB, w is a width of the current block, h is a height of the current block, MvPre is a precision of the motion vector for the sub-block, max is a maximum function, abs is an absolute value function, and $v_{0x}$, $v_{1x}$, $v_{2x}$, $v_{0y}$, $v_{1y}$, and $v_{2y}$ are motion vector components in a motion vector field derived based on the motion vectors for the current block.

13. A method comprising:
receiving, by a receiver, a bitstream;
selecting, by a processor, a current block from the bitstream for decoding by sub-block based affine inter-prediction;
obtaining, by the processor, a plurality of motion vectors for the current block from the bitstream;
deriving, by the processor, a sub-block size for a sub-block of the current block, the sub-block size including a sub-block width and a sub-block height;
determining, by the processor, a unidirectional width threshold (TwU), a bidirectional width threshold (TwB), a unidirectional height threshold (ThU), and a bidirectional height threshold (ThB), wherein a total value of TwB and ThB exceeds a total value of TwU and ThU, and wherein the total value of TwB and ThB is greater than the total value of TwU and ThU to ensure a minimum sub-block size for bidirectional inter-prediction exceeds a minimum sub-block size for unidirectional inter-prediction;
determining, by the processor, that the affine inter-prediction is unidirectional inter-prediction or bidirectional inter-prediction based on the bitstream;
based on the determination of unidirectional inter-prediction or bidirectional inter-prediction, applying, by the processor, the TwU or the TwB to the sub-block width;
based on the determination, applying, by the processor, the ThU or the ThB to the sub-block height;
deriving, by the processor, a motion vector for the sub-block based on motion vectors for the current block, the sub-block width, and the sub-block height;
employing, by the processor, the motion vector for the sub-block to reconstruct the sub-block based on a reference frame; and
forwarding, by the processor, a video sequence for display, the video sequence including the sub-block in a current frame.

14. The method of claim 13, wherein a value of TwB, a value of ThB, a value of TwU, and a value of ThU are stored as predefined values.

15. The method of claim 13, further comprising obtaining a value of TwB, a value of ThB, a value of TwU, a value of ThU, or combinations thereof, from a parameter set in the bitstream.

16. The method of claim 13, further comprising round the motion vector for the sub-block to a precision of one sixteenths accuracy.

17. The method of claim 13, wherein the sub-block size for the sub-block of the current block is derived according to:

$$\begin{cases} M = \text{clip3}\left(Tw, w, \frac{w \times MvPre}{\max(\text{abs}(v_{1x} - v_{0x}), \text{abs}(v_{1y} - v_{0y}))}\right) \\ N = \text{clip3}\left(Th, h, \frac{h \times MvPre}{\max(\text{abs}(v_{2x} - v_{0x}), \text{abs}(v_{2y} - v_{0y}))}\right) \end{cases}$$

where M is the sub-block width, N is the sub-block height, clip3 is a three parameter function that sets a first parameter as a lower threshold for a computation, a second parameter for an upper threshold for the computation, and a third parameter for the computation, Tw applies TwU or TwB, Th applies ThU or ThB, w is a width of the current block, h is a height of the current block, MvPre is a precision of the motion vector for the sub-block, max is a maximum function, abs is an absolute value function, and $v_{0x}$, $v_{1x}$, $v_{2x}$, $v_{0y}$, $v_{1y}$, and $v_{2y}$ are motion vector components in a motion vector field derived based on the motion vectors for the current block.

* * * * *